United States Patent [19]
Engel

[11] Patent Number: 6,109,818
[45] Date of Patent: Aug. 29, 2000

[54] RECOMBINATOR

[76] Inventor: Douglas A. Engel, 2935 W. Chenango Ave., Englewood, Colo. 80110

[21] Appl. No.: 09/111,488

[22] Filed: Jul. 7, 1998

[51] Int. Cl.[7] .................................................... B25G 3/18
[52] U.S. Cl. ...................... 403/322.2; 403/325; 403/317
[58] Field of Search ............................. 403/322.2, 322.1, 403/DIG. 1, 325, 319, 318, 317, 348; 24/573.1, 303, 575

[56] References Cited

U.S. PATENT DOCUMENTS

| | | | |
|---|---|---|---|
| 2,654,135 | 10/1953 | Grizzard et al. | 24/635 |
| 3,985,083 | 10/1976 | Pofferi | 403/381 |
| 5,286,129 | 2/1994 | French et al. | 403/24 |

*Primary Examiner*—Lynne H. Browne
*Assistant Examiner*—John R. Cottingham
*Attorney, Agent, or Firm*—Ramon L. Pizarro; Edwin H. Crabtree

[57] ABSTRACT

A recombinator for connecting and recombining sections of material. The recombinator including a cylindrical sleeve formed from at least two semi-cylindrical sections having edges and an internal arcuate surface. A first cylindrical hub is used to cooperate with the cylindrical sleeve. The cylindrical hub is formed from at least two semi-cylindrical hub sections, each semi-cylindrical hub section including an external arcuate surface adapted for mating with the internal arcuate surface of the cylindrical sleeve and having edges adapted for alignment with at least one of the edges of at least one of the semi-cylindrical sections. The semi-cylindrical hub sections also include at least one facet surface joining the edges of the external arcuate surface of the semi-cylindrical hub section. Each facet surface has been adapted for mating with the facet surface of another semi-cylindrical hub section. Slideable engagement and rotation of the cylindrical sleeve with and about the cylindrical hub is provided, so that rotation of the cylindrical sleeve about the cylindrical hub to a position where at least one edge of the cylindrical sleeve is aligned with at least one edge of the semi-cylindrical hub section allows separation of one of the semi-cylindrical hub sections together with one of the semi-cylindrical sleeve sections and another of the semi-cylindrical hub sections together with another of the semi-cylindrical sleeve sections.

15 Claims, 3 Drawing Sheets

RECOMBINATOR

BACKGROUND OF THE INVENTION (a) Field of the Invention

This invention generally relates to a re-combination device for either combining, re-combining, or joining sections of elongate flexible material, solid structures or other structures. More particularly, but not by way of limitation, to a re-connector system that allows mixing or weaving of the sections of material connected to the device or for exchanging or re-combining parts of the device with other similar sections of the device or likenesses of the device itself.

(b) Discussion of Known Art

The need to join two sections of string, wire, or similar flexible sections of material has been widely recognized. To meet this need, various connector devices have been developed. However, known devices join two sections and do not allow the re-combination of the two sections with another set of sections of string, wire, or the like. Well-known wire connectors typically join two sections wire in order to establish continuity. In order to connect the two sections of wire with another pair of wires, one typically has to completely separate the first two sections of wire and then join these with other wires. For example, if wire A and wire B are joined together and it is desired that wire A be joined with wire C and wire B be joined with wire D, known devices dictate that wires A and B be completely separated from one another and then joined with wires C and D, respectively. Thus, it will be appreciated that known devices are not particularly useful in situations where it is necessary that wires A and B remained connected or attached to one another while the connection of A and C and B and D is being established.

In situations where a model of genes or string-like molecules, for example, is needed to demonstrate possible combinations or re-combinations possible with the string-like structure, it is particularly useful to provide a model that allows joining and re-combining of string-like sections without allowing the original sections to become separated before the re-combination is completed. Thus there remains a need for a joining device or connector that allows combination and re-combination of the sections being joined.

Other situations, for example in the area of games and puzzles, the need for a device that allows combining and re-combining of sections of strand to produce varying weave and knot patterns or to provide connections to require special skill and intuition to resolve or untangle has also remained unmet.

Furthermore, there remains a need for device that can join or mix any design number of strand like sections to produce varied connections or weaves.

Still further, if the strands are dispensed with and only the re-combination of solid figures or objects is considered, there is a need for a device that allows re-combination or exchange of a chamber or part without taking the device out of service or apart to perform the exchange. For example, an electrical fuse, resistor or complex device could be exchanged in a single operation without having to first remove the existing electrical device, film canister, or hazardous material, etc.

Thus, there remains a need for an exchange system which is fully symmetric. Additionally, there remains a need for an exchange device that can keep the items to be exchanged fully concealed.

Further, there remains a need for a device that allows the re-combination of parts of toys, such as a head and a torso, with other toy parts without first removing, then replacing, the parts in a different order.

SUMMARY

It has been discovered that the problems left unanswered by known art can be solved by providing a re-combinator for joining sections of elongate sections of flexible material or solid or rigid structures, the re-combinator including:

a) a cylindrical sleeve formed from at least two semi-cylindrical sections, each semi-cylindrical section having edges and an internal arcuate surface;

b) a cylindrical hub formed from at least two semi-cylindrical hub sections, each semi-cylindrical hub section having an external arcuate surface adapted for mating with the internal arcuate surface of the cylindrical sleeve and having edges adapted for alignment with at least one of the edges of at least one of the semi-cylindrical sections; and c) a track and groove type of slideable engagement for allowing rotation of the cylindrical sleeve about the cylindrical hub, so that rotation of the cylindrical sleeve about the cylindrical hub allows alignment of the edges of the sleeve and the hub, so that the sleeve section and mating hub section may be separated from another sleeve section with its mating hub section in a new combination of sleeves and hubs.

It will be understood by referring to the enclosed drawings and the detailed description that follows, that the cylindrical sleeve sections essentially serve to hold the semi cylindrical hub sections together. The use of the track groove engagement of the sleeve sections and the hub sections stabilizes the assembly. Thus it will be understood that while the words track and groove, or engagement means, may be used herein to describe the stabilization means that prevents the separation of the hub portions from the sleeve portions, it is contemplated that a wide variety of known retainment or connection means may be used. For example a simple protruding radial wall on the sleeve internal arcuate surface, and a mating groove or surface on the hub sections may be used to provide the necessary engagement between the sleeve sections and the hub sections.

In a highly preferred embodiment of the invention an assembly is formed by using the basic components and arranging these components in a manner that allows them to mate with one another. Symmetry of assembly along a central axis, as well as symmetry of assembly about plane normal to the central axis of the device allows the joining of several different hub sections, which can in turn be pivotally attached to strands which may then be woven or re-combined with one another by rotating the different hub sections relative to the sleeve sections, and then separating the hub sections together with the sleeve sections. If the elongate material is dispensed with, the same operations allow mixing or re-combining of the hub and sleeve sections only, this time as solid structures.

In a highly preferred embodiment of the invention a locking mechanism is incorporated into the connector, between the hub sections and the sleeve sections. This locking mechanism prevents rotation of the hub sections relative to the sleeve sections and also provides a mechanical alignment means for the rotation operation. By preventing rotation of the hub sections relative to the sleeve sections at a position where a hub section and a mating sleeve section can be separated from other hub sections, each with a mating sleeve section, the integral sections can be separated together to hold the ends of a specific pair of strands together. The same assembly can then be placed against another set of hubs and sleeves, and then the sleeves and hubs rotated relative to one another within the sleeves to mix or weave the sections of strand with one another, and then the resulting combinations of the sleeve sections and joined hub sections can be separated from one another. Alternatively, it is possible to rotate only the sleeve sections. This causes a re-combination of the sleeves and hubs, while leaving the connection or weave of strands unchanged.

Thus it will be appreciated that the disclosed invention allows joining the two sections of strand, and then allows mixing of the joined sections of strand with other combinations of hubs sleeves and sections of strand. The disclosed invention also allows the mixing of hubs ans sleeves as solid structures if the strands are dispensed with to allow other applications of the invention.

Still further, it will be understood that the disclosed invention allows modeling of various naturally occurring materials, such as DNA, to allow the user to better predict or explain other phenomena.

Still further, it will be understood that the disclosed invention allows the user to switch combinations between components attached to the re-connector so as to switch out components from the original connector, for example, a hazardous nuclear component or other component which may be hazardous while in service may be replaced without completely disconnecting, or completely eliminating the existence of the original connection or assembled unit. It should also be understood that the two sleeve sections may consist of a single connected unit and be finished to retain a resistor, fuse, or other component. Two of these assemblies may then be brought together to change out a faulty component by simply making a 180 degree rotation, and eliminating the need to remove or completely disconnect any of the components. This general type of application could, for instance, be employed for exchanging a chamber that holds an astronaut or pilot, or used to change supplies between a satellite and a supply ship in an automated manner. Additionally, the invention could be used to exchange a hazardous material or component that must remain in service while the exchange is being carried out.

Thus, it will be understood that the disclosed invention can serve as an exchange system which is fully symmetric, and thus allow the user to carry out an exchange with minimal disturbance to the function of surrounding or cooperating systems. Additionally, the disclosed invention can serve as an exchange device that can keep the items to be exchanged fully concealed.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
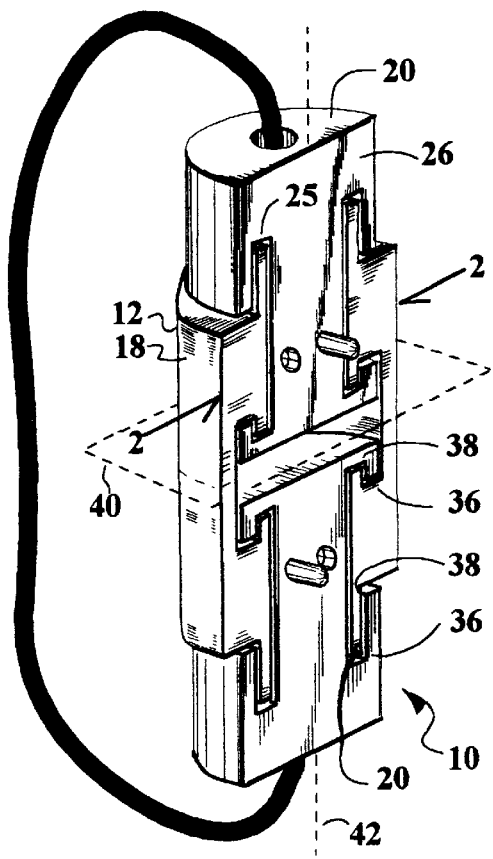
FIG. 1 is a perspective view of an embodiment of the invention, illustrating an embodiment of the invention incorporating an arrangement which is symmetrical about a central axis and about a plane that is perpendicular to the central axis.
Figure 2:
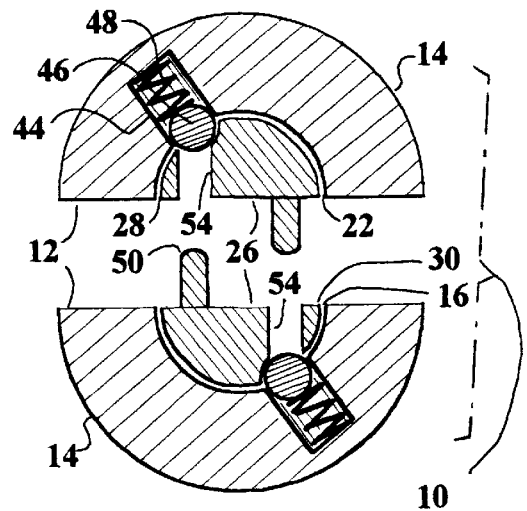
FIG. 2 is a cross section of the embodiment shown on FIG. 1, the section taken from FIG. 1, along plane 2—2.

From an examination of FIG. 1 and FIG. 2 it will be understood that a preferred embodiment of the disclosed recombinator 10 includes a cylindrical sleeve 12 formed from at least two semi-cylindrical sections 14. Each of the semi-cylindrical sections 14 includes edges 16 and a first end 18 and a second end 20, and an internal arcuate surface 22, shown on FIG. 2.

As can be understood from the illustrations contained in FIGS. 1, 2, 5, 6 and 8, the semi-cylindrical sleeve sections 14 of the cylindrical sleeve 12 cooperates with a first cylindrical hub 24 formed from at least two semi-cylindrical hub sections 26, each semi-cylindrical hub section 26 comprising an external arcuate surface 28 adapted for mating with the internal arcuate surface of said cylindrical sleeve and having edges 30 adapted for alignment with at least one of the edges 16 of at least one of the semi-cylindrical sections 14, the semi-cylindrical hub sections 26 further having at least one facet surface 32 joining the edges 30 of the external arcuate surface 28 of the semi-cylindrical hub section 26. Each facet surface 32 has been adapted for mating with the facet surface of another semi-cylindrical hub section 26 by means of alignment pins or guides 50, and mating guide holes 54.

Figure 5:
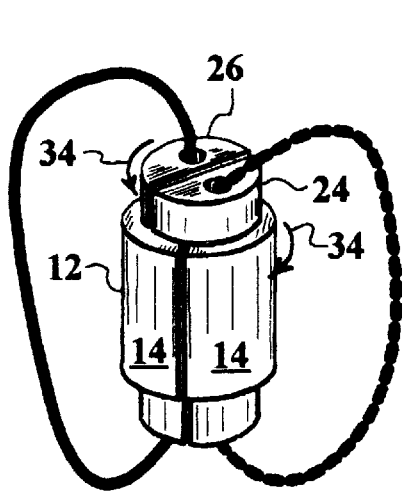
FIG. 5 is a perspective view illustrating the rotation of the sleeve sections relative to the hub sections.
Figure 6:
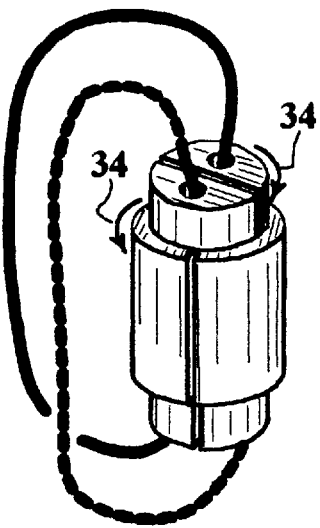
FIG. 6 is a perspective view illustrating the rotation of the hub sections relative to the sleeve sections to weave or cross the sections of strand together.
Figure 7:
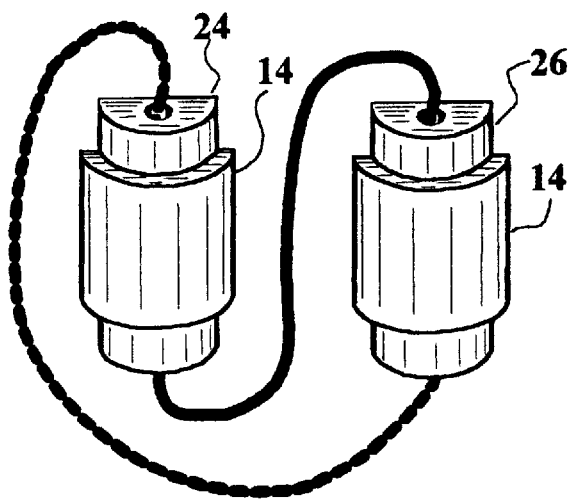
FIG. 7 is a perspective view illustrating two sections that have been joined prior to reconnecting the sections as shown on FIGS. 5 and 6.
Figure 8:
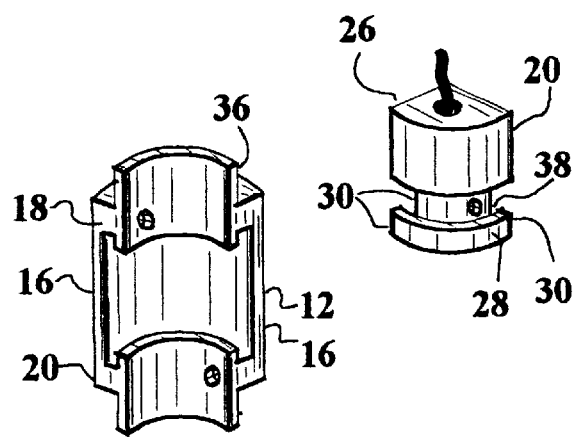
FIG. 8 illustrates the track sections, or means for securing the sleeve sections to the hub sections and allowing the sleeve sections to rotate about the hub sections.

Turning now to FIGS. 1, 2, 5 and 7, it will be understood that the cylindrical sleeve 12, and the semi-cylindrical sleeve sections 14, are connected to the cylindrical hub 24 by means for providing slideable engagement and rotation of the cylindrical sleeve 12 with and about the cylindrical hub 24, as indicated by arrow 34 in FIG. 5. A preferred embodiment of the means for providing slideable engagement and rotation includes at least one track section 36 incorporated into the internal arcuate surface of the cylindrical sleeve 12. The track section 36 will preferably be incorporated into all of the semi-cylindrical sleeve sections 14 of the invention to provide a continuous track about the circumference of the internal arcuate surface 22 of the cylindrical sleeve 12. A mating track section 38 will preferably be incorporated to each of the various semi-cylindrical hub sections 26 in order to provide a continuous mating track section and retainment means about the perimeter of the cylindrical hub 24.

An important function of the means for providing slideable engagement and rotation of the cylindrical sleeve 12 with and about the cylindrical hub 24 is to slidably connect at least one semi-cylindrical hub section 26 with at least one of the semi-cylindrical sleeve sections 14. This structure allows the continuous retainment of semi-cylindrical hub section 26 and semi-cylindrical sleeve sections 14 while the recombinator 10 has been separated as shown on FIGS. 1 and 7.

In a highly preferred embodiment of the invention one end of cylindrical hub contains a track section 38 near its first end 25. Additionally, the cylindrical sleeve 12 includes a track section 36 near its first end 18 as well as a track section 36 near its second end 20. This structure allows assembly of a symmetrical connector as shown on FIG. 1, with symmetry about a central axis 42 and about a plane 40, which is normal to the central axis 42.

FIGS. 1–5 illustrate that a preferred embodiment of the invention will include a locking mechanism 44 which will fix the position of a semi-cylindrical hub section 26 relative to a specific semi-cylindrical sleeve section 14. The locking mechanism will serve as a retractable engagement means which allows movement of the hub 24 relative to the sleeve 12. As shown on FIG. 2, a highly preferred embodiment of the locking mechanism 44 includes a spring 48 which is used to bias a ball 46 into the interface of the internal arcuate surface 22 of the cylindrical sleeve 12 and the external arcuate surface 28 cylindrical hub 24. The external arcuate surface 28 of the cylindrical hub 24 will preferably include a recessed area 54, which will accept the ball 46. This places the ball 46 across the interface between the hub 24 and the sleeve 12 to prevent rotation of the sleeve 12 relative to the hub 24.

As illustrated in FIGS. 1–4, the preferred position of the recess 54 will allow locking of the semi-cylindrical hub sections 26 relative to the semi-cylindrical sleeve sections 14 at a position where at least one edge 16 of the cylindrical sleeve section 14 is aligned with at least one edge 30 of one of the semi-cylindrical hub sections 26.

Figure 2A:
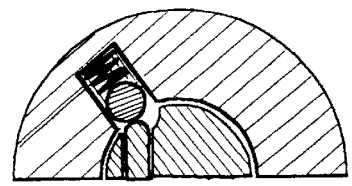
Figure 3:
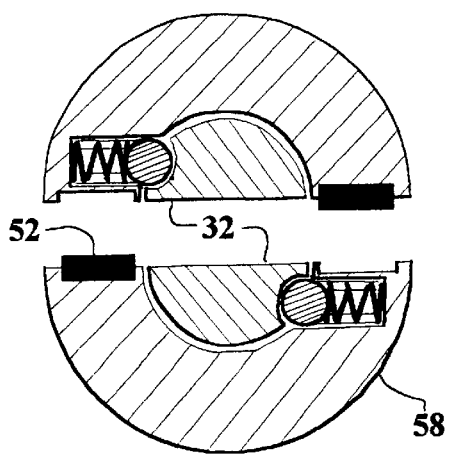
FIG. 3 is a variation of a cross section as shown on FIG. 2, the view showing an embodiment that includes magnetically activated locking mechanism for preventing the rotation of the hub sections relative to the sleeve sections.
Figure 4:
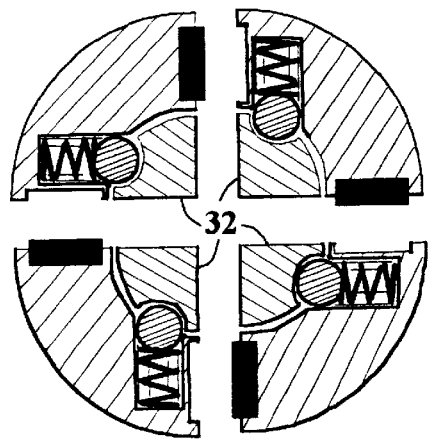
FIG. 4 is a variation of a cross section as shown on FIG. 2, the view showing an embodiment that includes hub sections that divide the hub into symmetrical quarter sections, together with the mating sleeve sections.

Also shown on FIGS. 2 and 2A is the cooperation of the ball 46 and pins 50 which are placed on a facet surface 32 of the semi-cylindrical hub sections 26. As shown on FIG. 2A, the pin 50 has been adapted for extending through the recess 54 in the semi-cylindrical hub sections 26, to push the ball 46 out of the recess 54 to a position where the semi-cylindrical hub sections 26 may rotate relative to the semi-cylindrical sleeve sections 14. The pins 50, when placed into the recesses 54, act both as a lock release and an alignment guide to allow the rotation to begin.

By placing the pins 50 on opposing facet surfaces 32, it is possible to unlock the semi-cylindrical hub sections 26 from the semi-cylindrical sleeve sections 14 by simply joining the hub sections against one another. When the semi-cylindrical hub sections 26 have been joined, the pins 50 move the balls 46 and allow rotation of the hub sections 26 relative to the sleeve sections 14. During rotation, the track section 46 prevents the semi-cylindrical hub sections 26 and the semi-cylindrical sleeve sections 14 from separating from one another. Rotation may be stopped at a partial or separable position, allowing the two assemblies to be left locked together until such time as it is desired to complete the rotation or recombination operation.

While the preferred embodiment of the locking mechanism 44 activates the retractable engagement means by means of the pins 50, it is contemplated that a magnet 52 or similar device may also be used to draw the ball 46 away from the interface between the hub 32 and the sleeve 58. In the embodiment shown on FIGS. 3 and 4, the magnets 52 will pull the ball 46, which would contain a ferrous composition, towards the spring 48, and retract the ball 46 to a position that would allow rotation of the sleeve 12 relative to the hub 58.

Figure 9:
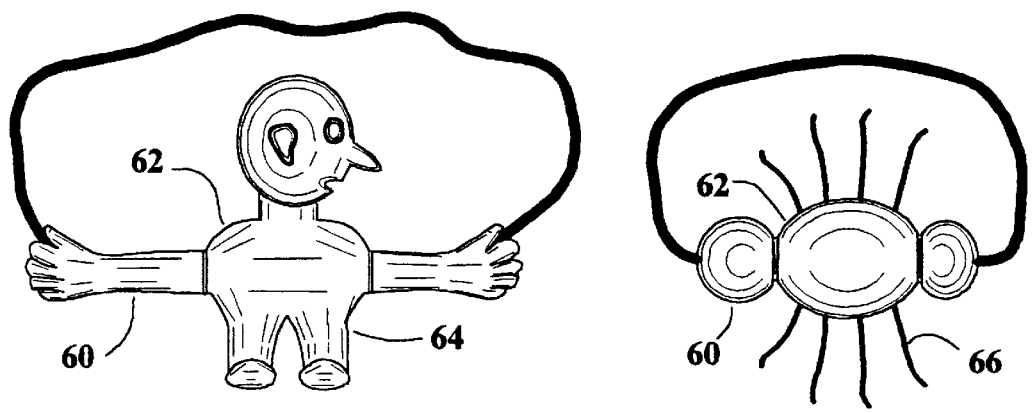
FIG. 9 illustrates the hub and sleeve section modified in the shape of two toy figures that include a stranded connection, but could also be constructed without the stranded material and allow re-combination of solid toy parts.

Referring now to FIG. 9 where the hubs 60 and sleeves 62 have been shown having an external shape to represent toy FIGS. 64 and 66. The hubs 60 and sleeves 62 allow mixing, linking, knotting and re-combining of the figures. In this embodiment of the invention, the mating edges and facets are still the same, and remain generally flat on one side. Only the external shape, cosmetic surfaces of the structure that does not affect the function of the disclosed mechanism have been altered as needed to effect the appropriate toy design.

Figure 10:
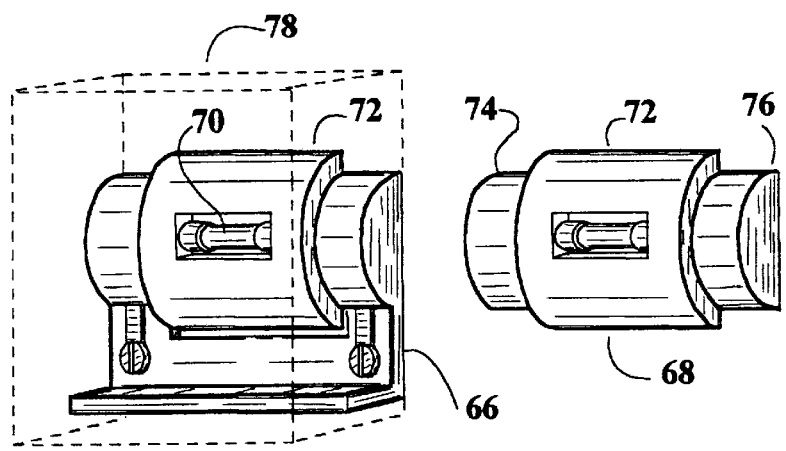
FIG. 10 illustrates the hub sections as modified into a solid unit with the sleeve sections modified to hold a fuse.

FIG. 10 illustrates an embodiment of the invention to form a change-out device 66, that is to be left in service or operational while a fuse 70 is being replaced. Thus the change-out device 66 supports one or a plurality of fuses 70 in a fuse support sleeves 68 and 72. To change out the operational fuse 70 without having to pull the functional fuse, one simply rotates the sleeve sections 72 relative to the hub sections 74 and 76. The hub section 74 and 76 consist of solid units in each assembly. Additionally, FIG. 10 shows the outline of a chamber 78 in dashed lines, representing a modification where the chamber 78 represents a hazardous receiver, a satellite requiring supplies or transfer of astronauts, etc. In this embodiment other well known devices may be added, such as mechanical gear drives to allow automated exchange or recombination of the sleeve sections.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A recombinator for connecting and recombining sections of material, the recombinator comprising:
   a cylindrical sleeve formed from at least two semi-cylindrical sections, each semi-cylindrical section having edges and a first end and a second end, and an internal arcuate surface;
   a first cylindrical hub formed from at least two semi-cylindrical hub sections, each semi-cylindrical hub section comprising an external arcuate surface adapted for mating with the internal arcuate surface of said cylindrical sleeve and having edges adapted for alignment with at least one of the edges of at least one of the semi-cylindrical sections, the semi-cylindrical hub sections further having at least one facet surface joining the edges of the external arcuate surface of said semi-cylindrical hub section, each facet surface being adapted for mating with the facet surface of another semi-cylindrical hub section; and engagement means for providing slideable engagement and rotation of said cylindrical sleeve with and about said cylindrical hub said engagement means being located on the internal arcuate surface of said cylindrical sleeve, so that rotation of said cylindrical sleeve about said cylindrical hub to a position where at least one edge of said cylindrical sleeve is aligned with at least one edge of said semi-cylindrical hub section allows separation of one of the semi-cylindrical hub sections together with one of the semi-cylindrical sleeve sections and another of the semi-cylindrical hub sections together with another of the semi-cylindrical sleeve sections.

2. A recombinator according to claim 1, wherein said engagement means on said internal arcuate surface of said cylindrical sleeve comprises a track means for engagement with said cylindrical hub, the track means being located near the second end of said cylindrical sleeve.

3. A recombinator according to claim 1, and further comprising a second cylindrical hub formed from at least two semi-cylindrical hub sections, each semi-cylindrical hub section comprising an external arcuate surface adapted for mating with the internal arcuate surface of said cylindrical sleeve and having edges adapted for alignment with at least one of the edges of at least one of the semi-cylindrical sections, the semi-cylindrical hub sections further having at least one facet surface joining the edges of the external arcuate surface of said semi-cylindrical hub section, each facet surface being adapted for mating with the facet surface of another semi-cylindrical hub section.

4. A recombinator according to claim 3, wherein said internal arcuate surface of said cylindrical sleeve further comprises a track means for engagement with said cylindrical hub, the track means being located near the first end and the second end of said cylindrical sleeve.

5. A recombinator comprising:
a cylindrical sleeve formed from at least two semi-cylindrical sections, each semi-cylindrical section having edges and a first end and a second end, and an internal arcuate surface;
a cylindrical hub formed from at least two semi-cylindrical hub sections, each semi-cylindrical hub section having means for attaching a flexible strand, each semi-cylindrical hub comprising an external arcuate surface adapted for mating with the internal arcuate surface of said cylindrical sleeve and having edges adapted for alignment with at least one of the edges of at least one of the semi-cylindrical sections, the semi-cylindrical hub sections further having at least one facet surface between the edges of the external arcuate surface of said semi-cylindrical hub section, the facet surface being adapted for mating with the facet surface of another semi-cylindrical hub section;
means for providing slideable engagement and rotation of said cylindrical sleeve with and about said cylindrical hub; and
a retractable engagement means, said retractable engagement means being movable from a first position wherein said engagement means prevents rotation of said cylindrical sleeve about said
cylindrical hub and a second position wherein said cylindrical hub may rotate relative to said cylindrical sleeve, so that at least one edge of said cylindrical sleeve may be aligned with at least one edge of said semi-cylindrical hub section and allow separation of one of the semi-cylindrical hub sections together with one of the semi-cylindrical sleeve sections and another of the semi-cylindrical hub sections together with another of the semi-cylindrical sleeve sections.

6. A recombinator according to claim 5, wherein said, wherein said internal arcuate surface of said cylindrical sleeve further comprises a track means for engagement with said cylindrical hub, the track means being located near the second end of said cylindrical sleeve.

7. A recombinator according to claim 6, and further comprising a second cylindrical hub formed from at least two semi-cylindrical hub sections, each semi-cylindrical hub section comprising an external arcuate surface adapted for mating with the internal arcuate surface of said cylindrical sleeve and having edges adapted for alignment with at least one of the edges of at least one of the semi-cylindrical sections, the semi-cylindrical hub sections further having at least one facet surface joining the edges of the external arcuate surface of said semi-cylindrical hub section, each facet surface being adapted for mating with the facet surface of another semi-cylindrical hub section.

8. A recombinator according to claim 7, wherein said internal arcuate surface of said cylindrical sleeve further comprises a track means for engagement with said cylindrical hub, the track means being located near the first end and the second end of said cylindrical sleeve.

9. A recombinator according to claim 5, and further comprising a second cylindrical hub formed from at least two semi-cylindrical hub sections, each semi-cylindrical hub section comprising an external arcuate surface adapted for mating with the internal arcuate surface of said cylindrical sleeve and having edges adapted for alignment with at least one of the edges of at least one of the semi-cylindrical sections, the semi-cylindrical hub sections further having at least one facet surface joining the edges of the external arcuate surface of said semi-cylindrical hub section, each facet surface being adapted for mating with the facet surface of another semi-cylindrical hub section.

10. A recombinator according to claim 5, wherein said internal arcuate surface of said cylindrical sleeve further comprises a track means for engagement with said cylindrical hub, the track means being located near the first end and the second end of said cylindrical sleeve.

11. A method for connecting and recombining sections of material, the method comprising:
providing a recombinator connector comprising:
a cylindrical sleeve formed from at least two semi-cylindrical sections, each semi-cylindrical section having edges and a first end and a second end, and an internal arcuate surface;
a first cylindrical hub formed from at least two semi-cylindrical hub sections, each semi-cylindrical hub section comprising an external arcuate surface adapted for mating with the internal arcuate surface of said cylindrical sleeve and having edges adapted for alignment with at least one of the edges of at least one of the semi-cylindrical sections, the semi-cylindrical hub sections further having at least one facet surface joining the edges of the external arcuate surface of said semi-cylindrical hub section, each facet surface being adapted for mating with the facet surface of another semi-cylindrical hub section; and engagement means for providing slideable engagement and rotation of said cylindrical sleeve with and about said cylindrical hub said engagement means being located on the internal arcuate surface of said cylindrical sleeve;

attaching the sections of material to be to be connected and re-combined to the sleeve and to at least one of the semi-cylindrical hub sections; and rotating said cylindrical sleeve about said cylindrical hub to a position where at least one edge of said cylindrical sleeve is aligned with at least one edge of said semi-cylindrical hub section allows separation of one of the semi-cylindrical hub sections together with one of the semi-cylindrical sleeve sections and another of the semi-cylindrical hub sections together with another of the semi-cylindrical sleeve sections.

12. A method according to claim 11, wherein said engagement means on said internal arcuate surface of said cylindrical sleeve comprises a track means for engagement with said cylindrical hub, the track means being located near the second end of said cylindrical sleeve.

13. A method according to claim 11 and further comprising:

providing a second cylindrical hub formed from at least two semi-cylindrical hub sections, each semi-cylindrical hub section comprising an external arcuate surface adapted for mating with the internal arcuate surface of said cylindrical sleeve and having edges adapted for alignment with at least one of the edges of at least one of the semi-cylindrical sections, the semi-cylindrical hub sections further having at least one facet surface joining the edges of the external arcuate surface of said semi-cylindrical hub section, each facet surface being adapted for mating with the facet surface of another semi-cylindrical hub section.

14. A method according to claim 13 wherein the articles to be connected and re-combined are attached to the first cylindrical hub and to the second cylindrical hub.

15. A method according to claim 13 wherein the articles to be connected and re-combined include means for transmitting a flow from the first cylindrical hub towards the second cylindrical hub.

* * * * *